United States Patent [19]
Walker

[11] 3,759,163
[45] Sept. 18, 1973

[54] COMBINATION EGG HOLDER AND TIMER

[75] Inventor: Harold L. Walker, Whitestone, N.Y.

[73] Assignee: Eggmatic Corporation, New York, N.Y.

[22] Filed: Dec. 4, 1970

[21] Appl. No.: 95,222

Related U.S. Application Data

[63] Continuation-in-part of Ser. No. 846,174, July 30, 1969, abandoned.

[52] U.S. Cl. .................. 99/336, 99/344, 99/357, 99/440
[51] Int. Cl. .................................. A47j 29/02
[58] Field of Search .................. 99/336, 334, 335, 99/357, 440, 344

[56] References Cited
UNITED STATES PATENTS

| | | | |
|---|---|---|---|
| 1,921,036 | 8/1933 | Matthews | 99/336 |
| 2,562,991 | 8/1951 | Rothschild | 99/440 X |
| 2,790,378 | 4/1957 | Zander | 99/336 |

FOREIGN PATENTS OR APPLICATIONS

| | | | |
|---|---|---|---|
| 119,735 | 11/1930 | Austria | 99/336 |
| 2,844 | 12/1891 | Great Britain | 99/336 |
| 335,730 | 10/1930 | Great Britain | |

*Primary Examiner*—Billy J. Wilhite
*Attorney*—Nolte and Nolte

[57] ABSTRACT

A boiled egg holder and timer in which the timing may be set for several types of boiled eggs, such as soft, medium and hard. The device is set in boiling water and a solid-to-liquid trigger, which is out of direct contact with the boiling water, actuates the elevating mechanism whereby the egg is lifted out of the boiling water when the egg is boiled to the selected consistency.

20 Claims, 11 Drawing Figures

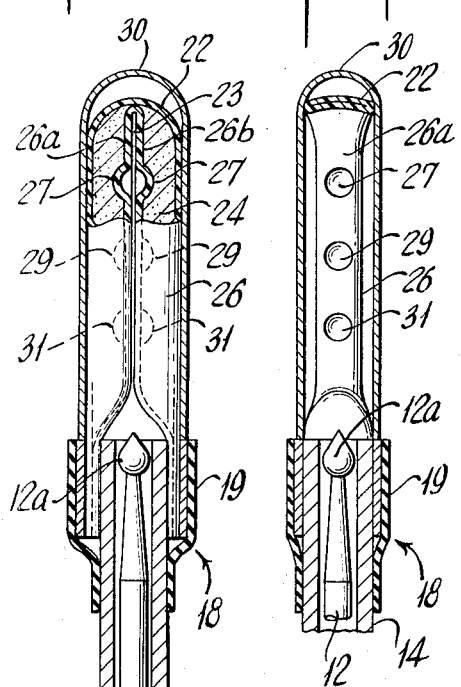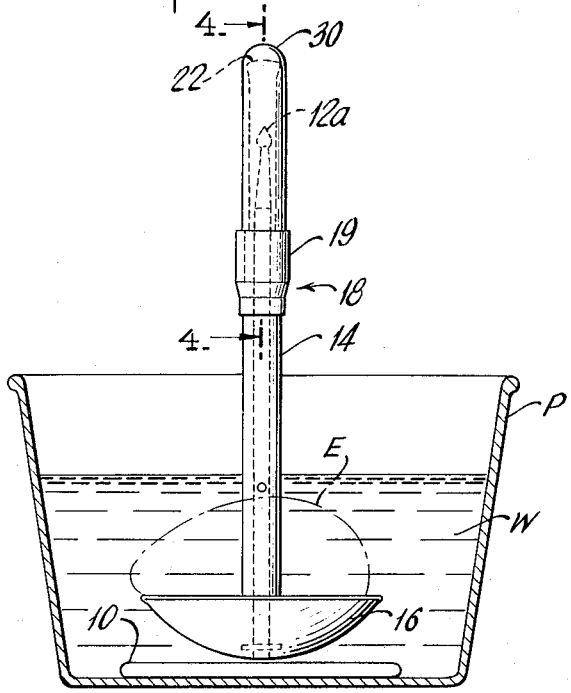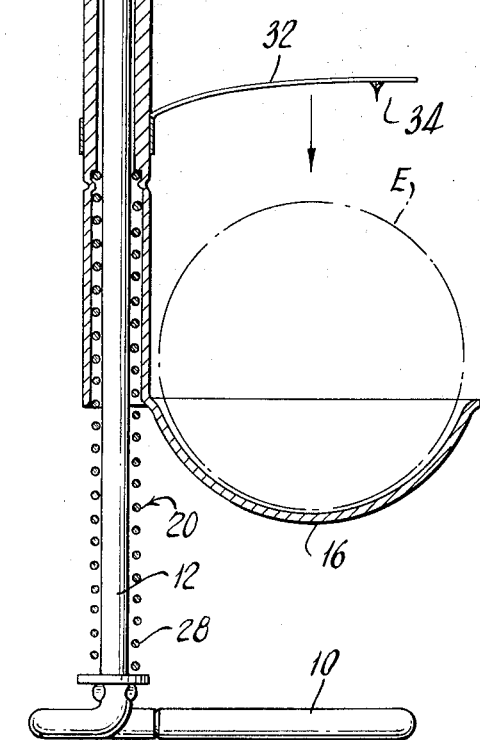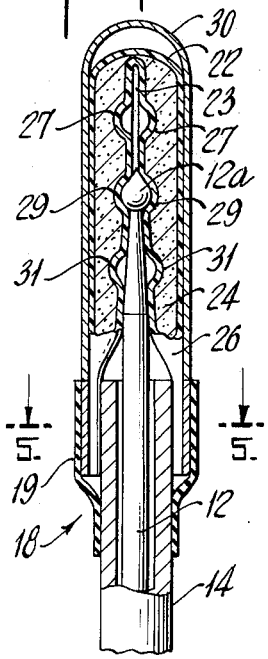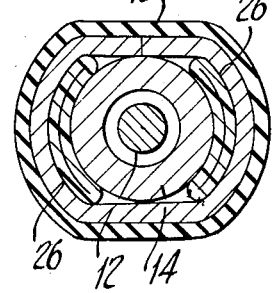

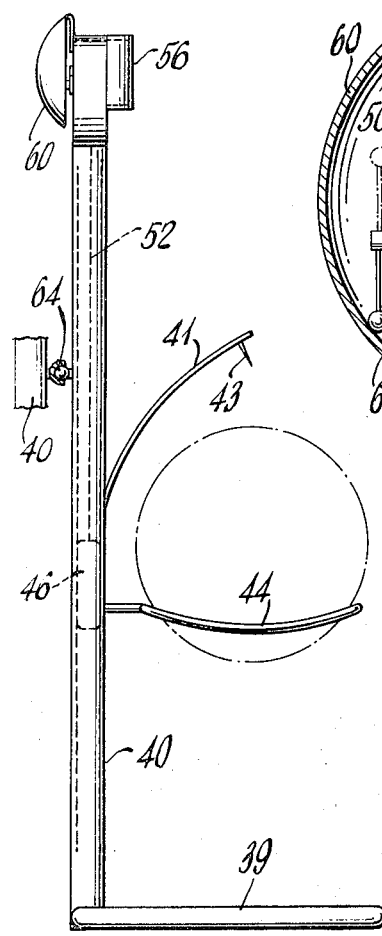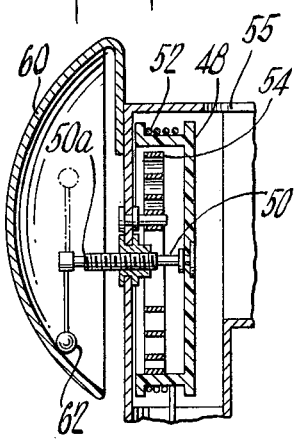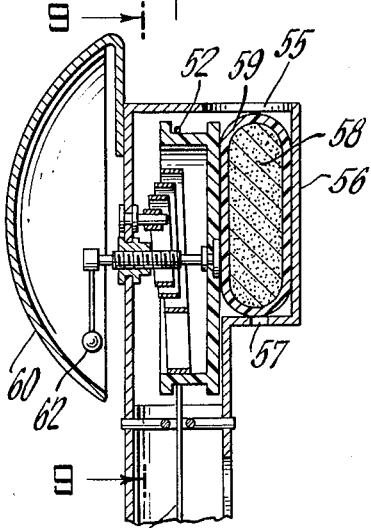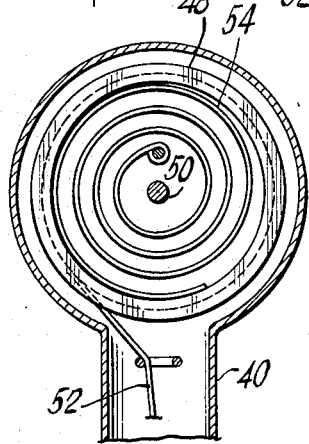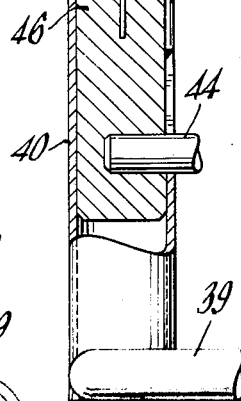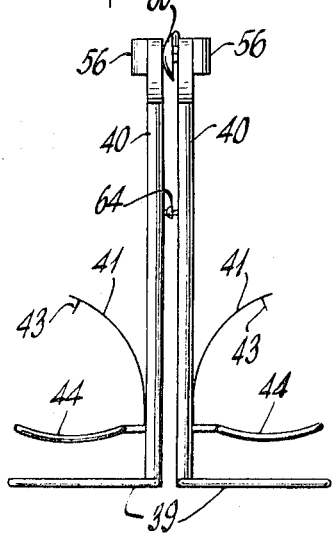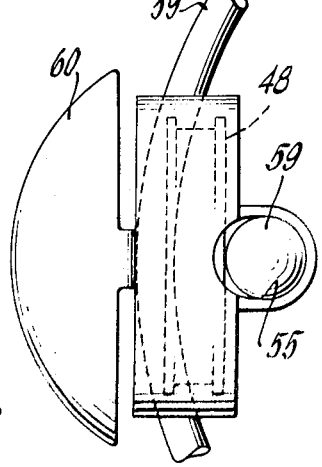

COMBINATION EGG HOLDER AND TIMER

This application is a continuation-in-part application of U.S. Patent application, Ser. No. 846,174, filed on July 30, 1969 now abandoned.

BACKGROUND OF THE INVENTION

It is well known that it is difficult to boil an egg to the proper degree of softness or hardness without continually watching and attending to the same. Previously, there have been a number of egg timers that have been sold to the public which involve separate egg timing arrangements, such as an enclosed hour glass of the sand-filled type or a short-period resettable timer in which an audio alarm is sounded when the egg is boiled to the proper consistency. However, a principal drawback of the foregoing type of arrangements is that the devices are not used in conjunction with a holder but are separated from the egg and the pot in which it is boiling. Therefore, it is incumbent upon the person preparing the egg to watch the egg and consequently, that person cannot do other things when he is intent upon boiling the egg to the right consistency.

SUMMARY OF THE INVENTION

It is therefore a principal object of the present invention to provide a combination egg holder and timer device in which the timing may be set for any number of boiled eggs, such as soft, medium and hard boiled eggs. Initially the egg is placed in a holder on a stand which is inserted in a pan of either hot or cold water, and after a prescribed period of time, the egg is elevated relatively slowly out of the boiling water. Therefore, the egg is ready for eating and cannot be overboiled, and the slow release of the device assures that the egg will not be damaged when the same is removed from the boiling water.

It is a further object of the present invention to provide a combination egg holder and timer utilizing a solid to liquid trigger which is constantly out of contact with the boiling water and therefore not susceptible to premature triggering as a result of temperature variations of the water.

It is a further object of the present invention to provide a number of combination egg holders and timers that may be utilized together and may be timed separately so as to have a combination of soft, medium and hard boiled eggs, as selected.

It is another object of the present invention to provide a combination egg holder and timer which is accurate, simple to make, and effective for the purposes intended. It should also be noted that the present device is inexpensive and can be massed-produced in quantity.

A further object of the present invention is to provide a combination egg holder and timer in which the same is under spring tension in the water during the boiling of the water and is released from spring tension upon the activation of a solid to liquid trigger, the latter being removed from contact with the boiling water but indirectly heated thereby.

The invention is illustrated by way of example in the accompanying drawings which form a part of this application and in which:

FIG. 1 is a partial sectional and partial elevational view of the combined egg holder and timer constructed in accordance with the teachings of the present invention and in a triggered position located in a pot of boiling water;

FIG. 2 is a partial sectional and a partial elevational view of the combined egg holder and timer in the trigger released position;

FIG. 3 is a fragmentary sectional view of the device shown in FIG. 2;

FIG. 4 is a view taken along the lines 4—4 of FIG. 1;

FIG. 5 is a view taken along the lines 5—5 of FIG. 4;

FIG. 6 is a partial sectional and a partial elevational view of a modification of the combined egg holder and timer shown in FIG. 1;

FIG. 7 is a partial top plan view of the modification shown in FIG. 6;

FIG. 8 is an enlarged partial vertical sectional view of the modification shown in FIG. 6, taken along the lines 8—8 of FIG. 7;

FIG. 9 is a partial sectional view of the rewind wheel taken along the lines 9—9 of FIG. 8; and FIG. 10 is a side elevational view of another embodiment of the invention in which two combined egg holder and timer units are coupled together.

DESCRIPTION OF THE PREFERRED EMBODIMENT

As shown in the drawings, the present combination egg holder and timer comprises a support 10 having an integral portion thereof being a vertical conducting rod 12. This vertical conducting rod 12 is also a heat conductor for the device. Mounted on the rod 12, is an elongated sleeve 14 having attached to its bottom thereof an elliptically shaped holder 16. This holder 16 is a frame-like device which holds an egg E. Surrounding the vertical rod 12 is an helical spring 20 which is also partially located within the sleeve 14. A sleeve-like retaining member 18 has a portion 19 thereof which is spaced from the sleeve 14 and engages and holds in the space a solid-to-liquid trigger 22. This trigger which is in a U-shaped form is a wax material 24 capsulated in a flexible covering 26. The space-confronting inner leg surfaces 26a and 26b of the U-shaped trigger 22 are provided with complementary indentation 27, 29 and 31 forming spaced latching members for the enlargement 12a which may be selectively placed in one set of indentations. The indentation pair 27 is for hard boiled eggs, while the indentation pairs 29 and 31 are for medium and soft boiled eggs respectively. The free end of the rod 12 provided with a preferably elliptical-shaped enlargement 12a extends up into the spacing formed by the U-shaped trigger. The elliptical-shaped enlargement 12A is slightly flexible. As seen in FIG. 4, this end, when the egg holder is set, extends all the way up into the opening 23 between the legs of the trigger. Therefore, the heat travelling through the rod 12 and end 12a will contact both legs of the solid-to-liquid trigger in the triggered position of the combination egg holder and timer as shown in FIGS. 1, 4 and 5.

The combination egg holder and time device operates as follows: Initially the device is set with enlarged end 12a of the rod 12 well within the space or opening 23 between the legs of the trigger 22.

The helical spring 20 surrounding the bottom of the rod 12 engages at one end the base 10 and engages at the other end the sleeve 14. Thus, the device is set against the pressure of spring 20.

The rod end 12a will be held in this position inasmuch the wax material 24 in the U-shaped trigger capsule is in a solid form and the slightly flexible end 12a firmly engages the same. This condition is shown in FIGS. 1, 4 and 5 of the drawings. The device is placed in a pot P with a certain amount of cold or hot water W which just completely submerges the egg. Heat generated by the boiling water is then conducted up rod 12 to the flexible tip 12a to gradually melt the wax 24 in the trigger capsule 26 from the bottom of the leg portions to the bight of the U-shaped trigger and when this occurs, the sleeve 14, due to the liquifying of the trigger material, moves upwardly urged by the spring 28 until the position shown in FIGS. 2 and 3 is reached in which the egg is elevated completely out of the boiling water.

It should be noted that there may be two or more egg holders 16 on the same sleeve 14 so that a number of eggs may be boiled at the same time and in the same pot P. Moreover, it is within the scope of the present invention to alter the amount of material and/or the configuration of the solid-to-liquid trigger 22 so that a variety of egg consistencies may be achieved, such as soft, medium or hard boiled eggs.

It should be noted that the eggs may be inserted into cold or partially heated water, in addition to boiling water, and that the eggs, when the proper amount of heat is applied to the solid-to-liquid trigger 22, will be removed from the water and no further cooking of the eggs will occur.

It is also within the scope of the present invention to provide a sliding metal cap 30 over the trigger 22 that can be adjusted to various positions on the trigger 22 in order to achieve further control of liquefying of the material within the trigger 22.

A spring steel wire 32 is fixed at one end to the sleeve 14 while the free end thereof is provided with a sharp, pointed projection 34, the latter being adapted to puncture the egg shell.

A further embodiment of the present invention is illustrated in FIG. 6 of the drawings in which the base 39 is provided with a hollow metallic vertical post 40, such as aluminum or copper, having an elongated, longitudinal slot 42. An egg carrier or holder 44 is provided with a part 46 that is adapted to move vertically within the post 40. The movement of the egg carrier 44 is accomplished by means of a rewind wheel 48 mounted on a shaft 50 provided with fine threads 50a. A cord 52, preferably of nylon, is secured at one end to the part 46 of the egg carrier 44 while the other end of the cord 52 is wound around the rewind wheel 48. The latter is spring-loaded by means of spring 54. A receptacle 56 having an open back end is mounted in front of the rewind wheel 48 and is provided with a plastic coated wax pill 58, such as polyethylene wax or similar material, which can be converted from a solid to a liquid phase by heating. On the shaft side of rewind wheel 48 is mounted a clapper 62 which cooperates with a gong 60 as the shaft moves to the left in FIG. 8 to the position shown in FIG. 8a.

As seen in FIGS. 7 and 8 and 8a the wax pill 58 impinges at 59 against the rewind wheel 48 with sufficient friction in its solid state to hold the wheel 48 against the tension of the spring 54.

In order to provide for replacement of the wax pill 58 the receptacle 56 is provided with an opening 55 on the top and a smaller aperture 57. The latter enables one to insert a rod or other elongated object therethrough in order to force the wax pill 58 out of the receptacle 56.

FIG. 9 illustrates the form of the helical spring 54 of the rewind wheel 48 which maintains the cord 52 under spring tension while the egg carrier 44 is submerged in the water.

FIG. 10 discloses the coupling 64 which couples the vertical posts 40 of adjacent units in a back-to-back arrangement.

The operation of the device as shown in FIG. 6 is as follows: When the egg carrier 44 is depressed into the water and moves down the vertical post 40 the rewind wheel 48 rotates on the fine threads 50a of shaft 50 in a predetermined direction and into frictional engagement with the adjacent surface of the plastic coated wax pill trigger 50 to thereby frictionally brake and hold the rewind wheel 48 against the pressure of spring 54. Since the egg on the egg carrier 44 is submerged in the boiling water heat is conducted up the metallic post 40 to melt the wax pill 58. As the water boils and the pill melts, the friction between the pill and the wheel 48 lessens until the wheel 48 is released from the frictional grip of the pill and the wheel 48 commences to rotate under the influence of the spring 54 and at the same time winds up the nylon cord 52 which lifts the egg carrier 44 out of the boiling water. The wheel 48 continues to rotate until the clapper 62 strikes the gong 60 thereby giving an audio alarm to signify that the egg has been boiled to the proper consistency. A coupling 64 is provided on post 40 for coupling two or more combination egg holders and timers together, if desired.

It should be apparent that the wax pills 58 can be produced so that they will constitute selective triggers for soft, medium or hard boiled eggs.

As in the embodiment of FIG. 2 a spring steel wire 41 with a sharp pointed projection 43 is provided for puncturing the egg shell.

What is claimed is:

1. A combination egg holder and timer for boiling an egg comprising a support stand adapted to be inserted in a container of water, said support stand being provided with an upstanding heat conducting post, a sleeve surrounding a substantial part of said post, a support rest for said egg to be boiled being connected to a part of the bottom of said sleeve, a solid-to-liquid trigger arranged and secured at the top of said sleeve, a spring surrounding a portion of said post and being partially positioned within said sleeve to bias the latter in an upward direction, the free end of said heat conducting post being adapted to engage and be held by said solid-to-liquid trigger when the latter is in the solid form upon the downward movement of said sleeve about said post against the basis of said spring thereby depressing said egg support rest into said water, said egg being maintained in said water until a predetermined amount of heat is conducted from said water which has reached the boiling point to said conducting post and to said solid-to-liquid trigger whereby at least part of the latter is caused to change from a solid to a liquid phase, the sleeve and its support rest for said egg being released to cause said egg to be elevated by said spring above the surface of the boiling water.

2. A combination egg holder and timer as claimed in claim 1 wherein said solid-to-liquid trigger is in encapsulated wax.

3. A combination egg holder and timer as claimed in claim 1 wherein said solid-to-liquid trigger is an inverted U-shaped flexible capsule with a wax therein.

4. A combination egg holder and timer as claimed in claim 3 wherein the top of said heat conducting post engages a substantial portion of both legs of said U- shaped flexible capsule thereby causing a gradual melting of the wax and a slow release of the trigger.

5. A combination egg holder and timer as claimed in claim 4 wherein the top of said heat conducting post has an enlargement thereon, a plurality of indentations in the legs of said U-shaped flexible capsule representing selected degrees of hardness of said egg to be boiled, said enlargement being inserted within the space between the legs of said U-shaped capsule and in selected indentations to thereby be maintained within said legs when the material in the latter is in a solid form.

6. A combination egg holder and timer as claimed in claim 5 wherein said enlargement at the top of said heat conducting post has limited flexibility.

7. A combination egg holder and timer as claimed in claim 1 wherein said egg support rest is integral with said sleeve.

8. A combination egg holder and timer as claimed in claim 1 further comprising a sliding metal control cap adapted to be inserted over said U-shaped flexible capsule for further controlling the liquefying of the material within said solid-to-liquid trigger.

9. A combination egg holder and timer as claimed in claim 1 further comprising a flexible arm secured at one end to said sleeve, and a pointed projection at the other end of said arm for puncturing the egg shell.

10. A combination egg holder and timer for boiling an egg comprising a support stand adapted to be inserted in a container of water, said support stand being provided with an upstanding heat-conducting standard, a support rest for said egg to be boiled having an upstanding post at least partly surrounding said standard and movable therealong, a spring surrounding a portion of said standard and biasing said post in an upward direction, a solid-to-liquid trigger arranged and secured on a part of said heat-conducting post, said support rest being depressed against spring pressure to a position wherein the egg is submerged in the water, said egg being maintained in said water until a predetermined amount of heat is conducted from said water which has reached the boiling point to said solid-to-liquid trigger by means of said heat-conducting standard whereby at least a part of the solid-to-liquid trigger is caused to change from a solid to a liquid phase thereby enabling the support rest for said egg to be released and said spring causing said egg to be elevated above the surface of said boiling water.

11. A combination egg holder and timer for boiling an egg as claimed in claim 10 wherein said support stand and said upstanding standard are integral.

12. A combination egg holder and timer for boiling an egg as claimed in claim 10 wherein the upper free end of said standard conducts heat from the water directly to said solid-to-liquid trigger.

13. A combination egg holder and timer for boiling an egg comprising a support stand adapted to be inserted in a container of heated water, said support stand having an upstanding heat conducting post in which at least a part thereof is hollow, an egg carrier for said egg to be boiled provided with a portion movable in the hollow part of said heat conducting post, a threaded axle mounted in said hollow part remote from said support stand, a spring-biased rewind wheel mounted for rotation on said axle, a cord attached at one end to said egg carrier and having the other end thereof wound about said wheel, and a wax pill trigger positioned adjacent to said wheel and when said egg carrier is lowered on said post to a position in which said egg carrier is submerged in said heated water, said rewind wheel rotates to a position into frictional engagement with said wax pill trigger, and the heat from the water is conducted up said post to said wax pill thereby melting the latter and releasing said rewind wheel for rotation in an opposite direction away from said wax pill and thereby rewind said cord about said wheel and elevate the egg carrier out of the water.

14. A combination egg holder and timer as claimed in claim 13 wherein said wax pill is plastic coated and the volume of said wax pill can be varied in order to produce soft, medium or hard boiled eggs as required.

15. A combination egg holder and timer as claimed in claim 13 further comprising an alarm device mounted adjacent to said rewind wheel on the side thereof remote from said wax pill whereby when said rewind wheel rotates in an opposite direction away from said wax pill said rewind wheel is operatively connected to said alarm to thereby activate the same.

16. A combination egg holder and timer as claimed in claim 15 wherein said rewind wheel is provided with a striking device, and said audio alarm is a bell that is struck by said striking device when said rewind wheel rotates in said opposite direction.

17. A combination egg holder and timer as claimed in claim 15 wherein said alarm device is an audio alarm.

18. A combination egg holder and timer as claimed in claim 13 further comprising a receptacle for said wax pill that is mounted on said vertical post adjacent to the top thereof.

19. A combination egg holder and timer as claimed in claim 13 wherein said wax pill is constituted of a polyethylene wax of low molecular weight.

20. A combination egg holder and timer for boiling an egg comprising a support stand adapted to be inserted in a container of heated water, said support stand having an upstanding heat conducting post in which at least a part thereof is hollow, an egg carrier for said egg to be boiled operatively connected to said support stand, a solid-to-liquid trigger arranged and secured adjacent to the upper extremity of said post, means biasing said egg carrier upwardly but said egg carrier being prevented from upward movement when said solid-to-liquid trigger is in a solid state, said egg on the egg carrier resting in said heated water until a predetermined amount of heat is conducted from said water which has reached the boiling point to said post and whereby at least part of said solid-to-liquid trigger is caused to change from a solid to a liquid phase thereby releasing said egg carrier whereby said egg is caused to be elevated above the surface of the boiling water.

* * * * *